United States Patent [19]

Sasamura et al.

[11] Patent Number: 4,521,817
[45] Date of Patent: Jun. 4, 1985

[54] CIRCUIT ARRANGEMENT FOR MAGNETIC RECORDING APPARATUS HAVING A MULTI-TRACK HEAD

[75] Inventors: Kohhei Sasamura; Takaro Mori, both of Sagamihara, Japan

[73] Assignee: Victor Company of Japan, Limited, Yokohama, Japan

[21] Appl. No.: 390,738

[22] Filed: Jun. 21, 1982

[30] Foreign Application Priority Data

Jun. 22, 1981 [JP] Japan .................................. 56-96355

[51] Int. Cl.³ .............................................. G11B 5/09
[52] U.S. Cl. ........................................ 360/46; 360/68
[58] Field of Search ................................... 360/46, 68

[56] References Cited

U.S. PATENT DOCUMENTS 4,386,378 5/1983 Guisinger .............................. 360/68

OTHER PUBLICATIONS

"Design of Magnetic Recording & Playback Amplifiers"-S. Sah et al., IEE-IERE Proceedings, India, vol. 13, No. 2, pp. 39-46, Mar. 1975.
Tietze/Schenk Halbleiter-Schaltungstechnik, vol. 5, 1980, publishing house Springer, pp. 244 to 245.

*Primary Examiner*—Vincent P. Canney
*Attorney, Agent, or Firm*—Pollock, VandeSande & Priddy

[57] ABSTRACT

In a circuit arrangement for magnetic recording apparatus having a multi-track head, a resistor network is provided so that each operational amplifier associated with each magnetic head included in the multi-track head functions as a constant-current circuit. The resistances of four resistors in the resistor network are selected so that no current flows via one resistor interposed between the output terminal of the operational amplifier and a terminal of the head in receipt of no input signal even if leakage flux emitted from adjacent head is picked up by the head. Therefore, undesirable influence due to crosstalk can be effectively prevented, providing high quality reproduction in the case of audio signal recording or low bit error rate in the case of digital recording.

1 Claim, 4 Drawing Figures

CIRCUIT ARRANGEMENT FOR MAGNETIC RECORDING APPARATUS HAVING A MULTI-TRACK HEAD

BACKGROUND OF THE INVENTION

This invention relates generally to magnetic tape recording apparatus, and more particularly, the present invention relates to a circuit arrangement for such apparatus having a multi-track head for recording information on a plurality of parallel tracks on a magnetic recording tape or the like.

In a magnetic recording apparatus for recording information on a multi-track by means of a multi-track head, crosstalk which tends to occur on recording should be minimized so that recorded signals are not undesirably affected resulting in errors. In some conventional circuit arrangements used for multi-track recording, a crosstalk cancelling circuit or canceller has been employed for minimizing undesirable crosstalk. However, since such a canceller has to be provided for each channel, when the number of tracks to be simultaneously made by a single multi-track head is great, the number of cancellers should be increased accordingly. As a result, circuit arrangement becomes complex, requiring many parts and thus the manufacturing cost tends to increase.

SUMMARY OF THE INVENTION

The present invention has been developed in order to remove the above-described drawbacks inherent to the conventional circuit arrangement for multi-track recording.

It is, therefore, an object of the present invention to provide a circuit arrangement for magnetic recording apparatus, which is capable of effectively reducing undesirable crosstalk between adjacent tracks on a recording medium without employing conventional crosstalk cancellers.

According to a feature of the present invention, resistor network is provided so that an operational amplifier associated with each head of the multi-track head functions as a constant-current amplifier. As a result, the impedance of the winding, of the head is kept substantially constant throughnout a wide operating frequency range. Therefore, leakage flux from a head gap does not cause adjacent head or heads to undesirably record error signals.

With the circuit arrangement according to the present invention, it is possible to provide a simple circuit structure which can be manufactured at a low cost, and it is also possible to record various signals including digital signals with satisfactory S/N. Therefore, error rate on reproduction is very low, while high quality of reproduced signals can be obtained. In addition, since there is no need to take particular measure for preventing crosstalk when designing a multi-track head, a multi-track head can be simply and readily designed and manufactured. Furthermore, it is possible to detect the amount of each current flowing through each head of the multi-track head by measuring the voltage at each input terminal.

In accordance with the present invention there is provided a circuit arrangement for recording a plurality of signals on multi-track by means of a multi-track head on a magnetic recording medium, comprising: a plurality of amplifiers each responsive to each of the plurality of signals to be recorded, the output signal from each of the amplifiers being fed to each head of the multi-track head; and means for causing each of the amplifiers to function as a constant-current amplifier throughout the entire frequency range of the input signals.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, a conventional circuit arrangement associated with a multi-track head for recording on a multi-track will be described for a better understanding of the present invention.

Figure 1:
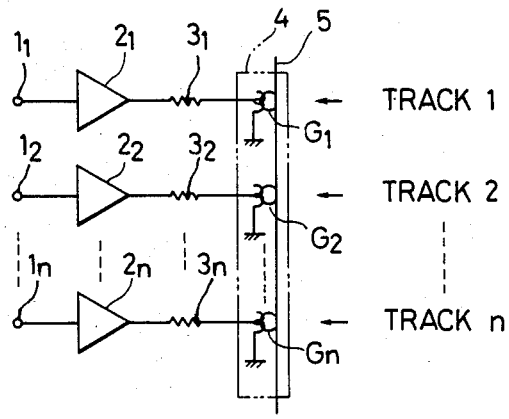
FIG. 1 is a circuit diagram of a conventional circuit associated with a multi-track head with which multi-track recording is effected.

FIG. 1 shows a circuit diagram of the conventional circuit used in recording apparatus of the type having a multi-track head. A plurality of input signals, such as digital signals, are fed via input terminals $1_1$ to $1_n$ (n is a positive integer greater than one) to a plurality of amplifiers $2_1$ to $2_n$. Amplified digital signals derived from the output terminals of the amplifiers $2_1$ to $2_n$ are fed via resistors $3_1$ to $3_n$ to recording heads $G_1$ to $G_n$ included in a multi-track head 4 so that the plurality of digital signals are recording on a magnetic recording tape 5, forming a plurality of parallel tracks along the longitudinal direction of the tape 5. Although the circuit is designed to form a number of tracks on the tape 5, only three magnetic heads $G_1$ to $G_n$ are shown to be included in the multi-track head 4 for simplicity, while only three amplifiers $2_1$ to $2_n$ and three resistors are shown.

Each of the recording amplifiers $2_1$ to $2_n$ has a low output impedance so as to feed the digital signal to the corresponding magnetic head $G_1$, $G_2$ or $G_n$ with so-called constant-voltage drive operation. Since each of the magnetic heads $G_1$ to $G_n$ is comprised of a coil, it functions as an inductive load when viewed from the associated amplifier $2_1$, $2_2$ or $2_n$. Therefore, the impedance of each of the magnetic heads $G_1$ to $G_n$ varies in accordance with the frequency of the recording signal applied thereto. Suppose that the input digital signals are of wide frequency range, the impedance of the magnetic heads $G_1$ to $G_n$ necessarily change according to the variation in the frequency because of the constant-voltage drive system. The change in impedance results in the change in the currents respectively flowing through the magnetic heads $G_1$ to $G_n$.

In order to prevent such undesirable change in the currents flowing through the magnetic heads $G_1$ to $G_n$, in the conventional circuit, the resistance $R_0 (\Omega)$ of each of the resistors $3_1$ to $3_n$ is selected to satisfy the relationship of:

$$R_0 > Z_H$$

wherein $Z_H (\Omega)$ is the impedance of each of the magnetic heads $G_1$ to $G_n$ of the multi-track head 4 resulted when the input digital signal has a high frequency.

With the above-mentioned selection of the resistance value, undesirable change in the recording currents can be prevented. Namely, a recording characteristic represented by a curve II in FIG. 2 can be obtained so that substantial uniform recording can be effected throughout the entire frequency range of the input signal.

When it is intended to have a recording characteristic approach a given characteristic without depending on the frequency, the value of the resistance $R_0$ should be set to a value which is much greater than $Z_H$. However, when $R_0$ is made very large, the circuit of FIG. 1 suffers from considerable loss in power, and therefore, it is needed to increase the gain of each of the amplifiers $2_1$ to $2_n$ accordingly. Such a gain increase is undesirable in practical use, and therefore, it has been impossible to set the value of $R_0$ to a very large value.

Figure 2:
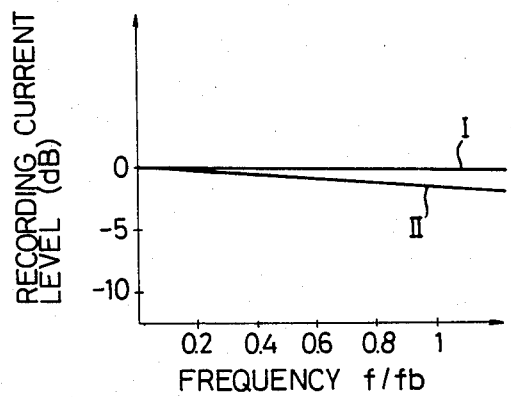
FIG. 2 is an explanatory diagram showing constant-current characteristic.
Figure 3:
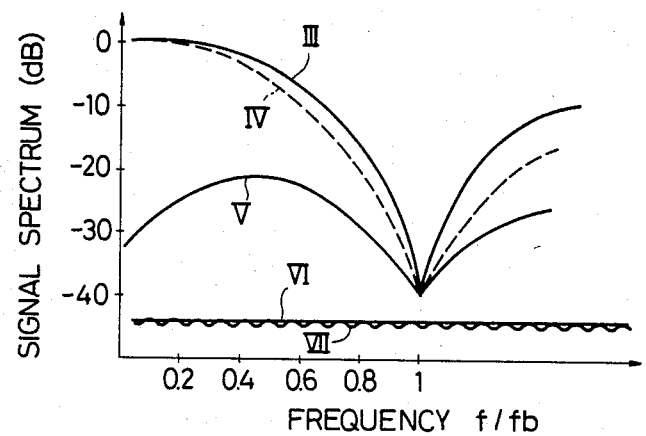
FIG. 3 is a graph showing spectrum characteristics of an input signal, a recording signal and a current caused by undesirable induction due to crosstalk in both a conventional circuit and a circuit according to the present invention.

When recording is effected with a conventional recording apparatus having the conventional circuit used in the above operating condition on an assumption that the magnetic heads $G_1$ to $G_n$ of the multi-track head 4 has the recording signal current vs frequency characteristic indicated by the curve II in FIG. 2, if the input digital signal is an NRZ random code signal having a spectrum characteristic indicated by a solid curve III in FIG. 3, the level of the spectrum characteristic curve lowers from the level of the curve III as shown by a dotted curve IV. In FIGS. 2 and 3, the reference fb indicates the bit frequency.

As is well known, in a multi-track head having a plurality of head gaps aligned for forming multi-track on a recording tape, magnetic flux leakage occurs between adjacent head gaps. Suppose that a given digital signal is applied to the input terminal $1_1$ of FIG. 1, while no signal is fed to another input terminal $1_2$. In such case, a recording current corresponding to the input digital signal fed to the input terminal 11 flows via the head $G_1$ with a characteristic indicated by the curve III of FIG. 3 to generate magnetic flux around the head gap thereof. At this time, leakage flux from the head gap of the head $G_1$ is picked up by the adjacent head $G_2$ inducing a current flowing through the winding of the head $G_2$ as indicated by a curve V in FIG. 3. In other words, a voltage induced across the terminals of the winding of the head $G_2$ due to the leakage flux from the head $G_1$ functions as a voltage source which causes a current to flow through a path including ground, the amplifier $2_n$ and the resistor $3_n$. Since this current flowing through the winding of the head $G_2$ results in magnetic flux at its gap, recording is effected undesirably on the associated track. This undesirable recording due to leakage flux from adjacent head gap or head gaps is called crosstalk, and the tendency of crosstalk increases as the track density increases because of less space between adjacent head gaps. Such crosstalk occurred on recording will result in errors which is encounterd on reproduction of the recorded signals. Especially, when recording and reproducing audio signals with a PCM (pulse code modulation) system or the like on a manetic recording tape, such crosstalk results in increase in bit error rate to deteriorate the quality of the reproduced audio sounds.

Various techniques have been adapted hitherto to minimize the undesirable crosstalk. Since it is impossible, with techniques of today, to perfectly prevent leakage flux from being picked up by adjacent head or heads in a multi-track head having a number of heads, so-called crosstalk canceller has been additionally provided so that crosstalk components are added to the original crosstalk components with inversed phase. However, as described at the beginning of this specification, employment of such a crosstalk canceller is required for each channel circuit corresponding to the tracks to be made, resulting in increase in manufacturing cost.

Figure 4:
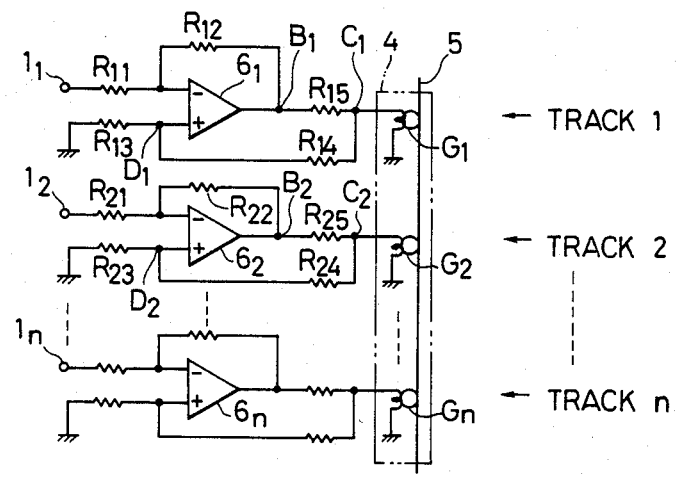
FIG. 4 is a schematic circuit diagram showing an embodiment of the present invention.

FIG. 4 illustrates a schematic diagram of an embodiment of the circuit arrangement according to the present invention. The circuit arrangement of FIG. 4 comprises a plurality of input terminals $1_1$ to $1_n$ and a plurality of magnetic heads $G_1$ to $G_n$ included in a multi-track head 4 in the same manner as in the conventional circuit of FIG. 1. The circuitry of FIG. 1 comprises a plurality of like circuits respectively associated with the channels and corresponding tracks to be made. Since the circuit for each channel includes a plurality of resistors, an amplifier and a magnetic head in the same manner as other circuits for other channels, description will be made on one circuit connected to the input terminal $1_1$.

The input terminal 11 is connected via a resistor $R_{11}$ to an inverting input terminal $(-)$ of an operational amplifier $6_1$ having a noninverting input terminal $(+)$ connected via a resistor $R_{13}$ to ground. The output terminal of the amplifier $6_1$ is connected via a feedback resistor $R_{12}$ to the inverting input terminal $(-)$ thereof, and is further connected via a resistor $R_{15}$ to a first terminal of the winding of the magnetic head $G_1$ having a second terminal connected to ground. In addition another resistor $R_{14}$ is connected between the noninverting input terminal $(+)$ of the amplifier $6_1$ and the first terminal of the winding of the head $G_1$.

Remaining circuits respectively provided between the input terminals $1_2$ to $1_n$ and heads $G_2$ to $G_n$ have the same structure as the above-described circuit provided between the input terminal $1_1$ and the head $G_1$. Namely, each circuit comprises an amplifier, $6_2, \ldots 6_n$, and five resistors connected in the same manner as described in the above. For instance, a second circuit between the input terminal $1_2$ and the second head $G_2$ comprises five resistors $R_{21}$, $R_{22}$, $R_{23}$, $R_{24}$ and $R_{25}$ connected to the operational amplifier $6_2$ in the same manner as the resistors $R_{11}$ to $R_{15}$.

Turning back to the first circuit provided between the input terminal $1_1$ and the head $G_1$, the resistances of the resistors $R_{11}$, $R_{12}$, $R_{13}$ and $R_{14}$ are selected to satisfy the following relationship:

$$R_{12}/R_{11} = R_{14}/R_{13} = R_Y/R_X \qquad (1)$$

In other circuits between the input terminals $1_2$ to $1_n$ and the heads $G_2$ to $G_n$, the above relationship is applied in the same manner. With this relationship each of the amplifiers $6_1$ to $6_n$ constitutes a constant-current circuit as will be described later.

Assuming that an input signal of ei [V] is fed to the input terminal $1_1$ and a voltage expressed by eo [V] is developed at a junction $C_1$ between the resistor $R_{14}$ and $R_{15}$, a feedback voltage generated at a junction $D_1$ between the resistors $R_{13}$ and $R_{14}$ as a result of positive feedback is given by:

$$eo \cdot \frac{R_{13}}{R_{13} + R_{14}} \quad [V]$$

Accordingly, the output voltage developed at the output terminal $B_1$ of the operational amplifier $6_1$ is given by:

$$-ei \cdot \frac{R_{12}}{R_{11}} + eo \cdot \frac{R_{13}}{R_{13} + R_{14}} \cdot \frac{R_{11} + R_{12}}{R_{11}} \quad [V] \quad (2)$$

Substituting Eq. (1) to Formula (2), Formula (2) is simplified as:

$$-\frac{R_Y}{R_X} \cdot ei + eo$$

Therefore, the voltage difference between the junctions $B_1$ or $C_1$ is given by:

$$\frac{R_Y}{R_X} \cdot ei$$

Accordingly, the current flowing through the resistor $R_{15}$ is given by:

$$\frac{R_Y}{R_X} \cdot ei/R_{15} \quad [A]$$

Suppose that the winding of the magnetic head $G_1$ has an impedance $Z1 \ [\Omega]$ having a relationship of $R13 + R14 \gg Z1$, a current given below flows via the winding of the magnetic head $G_1$.

$$\frac{R_Y}{R_X} \cdot ei/R15 \quad [A]$$

In the above, if $R_X = R_Y = R$, a current $ei/R_{15}$ [A] flows via the head $G_1$.

This means that the recording current flowing through each of the windings of the heads $G_1$ to $G_n$ exhibits a characteristic of the flat curve I of FIG. 1 irrespective of the change in the impedance of each of the heads $G_1$ to $G_n$. Therefore, when an NRZ random code signal having a charateristic of the curve III of FIG. 3 is fed to the input terminal $1_1$, the recording current flowing through the magnetic head $G_1$ exhibits a signal spectrum as shown by the curve III.

Suppose no input signal is fed to the second input terminal $1_2$ at this time, leakage flux emitted from the head gap of the head $G_1$ is picked up by the adjacent head $G_2$ to induce a voltage across the winding of the head $G_2$. The induced voltage results in currents flowing through the resistors $R_{24}$ and $R_{25}$ respectively. Using el' [V] for the induced voltage generated by the head $G_2$, the potential at the junction $C_2$ between the resistors $R_{24}$ and $R_{25}$ equals el' [V]. Therefore, the potential at the noninverting input terminal (+) is given by:

$$el' \cdot \frac{R_{23}}{R_{23} + R_{24}} \quad [V]$$

As a result, the potential at the output terminal $B_1$ of the operational amplifier $6_2$ is given by:

$$el' \cdot \frac{R_{23}}{R_{23} + R_{24}} \cdot \frac{R_{21} + R_{22}}{R_{21}} \quad [V]$$

Since the resistances R21, R22, R23 and R24 have been selected so as to satisfy Eq. (1) as described in the above, the voltage at the output terminal $B_2$ of the second operational amplifier $6_2$ equals el'. Consequently, no current flows via the resistor $R_{25}$ because the voltages at both ends thereof are equal to each other.

The resistance $R_{24}$ is set to a sufficiently large value, while it satisfies Eq. (1), and therefore, the amount of current flowing through the resistor $R_{24}$ is negligibly small. Accordingly, the current flowing through the winding of the head $G_2$ because of a loop formed by the head $G_2$, the series connection of the resistors $R_{24}$ and $R_{23}$ and ground shows a characteristic of a curve VI of FIG. 3. Another curve VII shows the level of system noise which is inherent to the recording circuit associated with each of the recording heads $G_1$ to $G_n$. It will be seen from FIG. 3 that the level of the curve VI is substantially equal to that of the system noise throughout the entire frequency range. Namely, undesirable crosstalk between adjacent heads does not occur when the circuit arrangement of FIG. 4 is employed.

From the foregoing it will be understood that when no signal is fed to a head, only a negligibly small current flows via the head although the head picks up leakage flux from adjacent head or heads. Accordingly, each head is capable of recording only desired signals irrespectively of the presence of leakage flux which tends to cause the occurrence of crosstalk.

The above description has been made taking an example of recording a digital signal of binary code because digital signals are apt to be influenced by crosstalk because the impedance of each head drastically changes throughout the entire frequency range. Although such a remarkable change in impedance does not occur when recording an audio signal by means of a multi-track head, the circuit arrangement according to the present invention may also be used for recording audio signals.

The above-described embodiment is just an example of the present invention, and therefore, it will be apparent for those skilled in the art that many modifications and variations may be made without departing from the spirit of the present invention.

What is claimed is:

1. A circuit arrangement for recording a plurality of signals on a multi-track by means of a multi-track head on a magnetic recording medium, comprising:
   (a) a plurality of recording heads included in the multi-track head;
   (b) a plurality of amplifiers responsive respectively to said plurality of signals to be recorded, the output signal from said amplifiers being respectively fed to the heads, each of said amplifiers having an operational amplifier having an inverting input terminal, a noninverting input terminal and an output terminal; and
   (c) means for causing each of said amplifiers to function as a constant-current amplifier throughout the entire frequency range of said input signals, said means having first to fifth resistors connected to each of said operational amplifiers, said first resistor being connected between an input terminal from which one of said plurality of signals is fed, and said inverting input terminal, said second resistor being connected between said inverting input terminal and said output terminal, said third resistor being connected between said noninverting input terminal and ground, said fourth resistor being connected between said noninverting input terminal and a first terminal of said head having a second terminal connected to ground, and said fifth resistor being connected between said output terminal and said first terminal of said head, the resistances of said first to fourth resistors being selected to satisfy the relationship of:

$$R_{12}/R_{11} = R_{14}/R_{13}$$

wherein $R_{11}$, $R_{12}$, $R_{13}$ and $R_{14}$ are respectively the resistances of said first to fourth resistors.

* * * * *